Oct. 17, 1967    G. BOMBARDIER    3,347,601
ENDLESS TRACK FOR TRACK-LAYING VEHICLE
Filed Jan. 21, 1966

INVENTOR
Germain BOMBARDIER
BY Pierre Lespérance

PATENT AGENT

United States Patent Office 3,347,601
Patented Oct. 17, 1967

3,347,601
ENDLESS TRACK FOR TRACK-LAYING VEHICLE
Germain Bombardier, Valcourt, Quebec, Canada
Filed Jan. 21, 1966, Ser. No. 522,068
1 Claim. (Cl. 305—35)

ABSTRACT OF THE DISCLOSURE

This invention relates to an endless track for track laying vehicles comprising spaced parallel flexible rubber bands connected by cross bars for driving engagement by a sprocket wheel. To prevent excessive flexing, lateral displacement, elongation, and contraction, metal chain links are located along the face of and clamped to the track by the cross bars.

---

Figure 4:
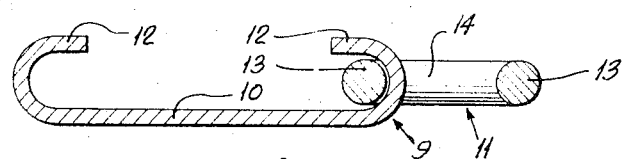

The present invention relates to track-laying vehicles and, more particularly, to the endless track assemblies thereof.

It is known to provide track-laying vehicles with a pair of endless track assemblies each consisting of spaced parallel endless flexible bands, of rubber or other rubber-like material, interconnected by cross bars trained on rubber wheels, including sprocket wheels having rubber teeth, to thereby form track-laying vehicles of considerably lighter weight and of more maneuverability and of smoother and quieter operation than track vehicles in which the track assemblies are made entirely of metal and are trained on metal wheels.

Track-laying vehicles of the character described are widely used for forest operations. However, it has been found that over very rough terrains, tree stumps, pointed rocks, and the like obstructions which the endless tracks have to negotiate, sometimes produce tearing of the rubber bands and jumping of the endless tracks off the wheels, due to the high flexibility of the rubber bands and longitudinal twisting of said tracks and due also to the relatively large elongation of said rubber bands under high stress.

It is the general object of the present invention to provide an endless track assembly which, while retaining all the advantages of an endless track composed of rubber bands, will eliminate practically all the avobe-noted disadvantages thereof and will result in an endless truck of much prolonged usage and in which the tendency to jump off the wheel of the vehicle, will be practically eliminated.

Another object of the present invention resides in the provision of an endless track of the character described, in which means are provided to limit, in a positive manner, the degree of elongation and contraction of the rubber bands, which thereby enables to obtain the following results:

The bands will be allowed to curve around a much greater radius of a circle when going over tree stumps, rocks and the like; the tendency for the track to move laterally with respect to the wheels under the action of lateral forces exerted thereon, will be practically eliminated, together with the tendency of a conventional track assembly to twist about its longitudinal axis under the action of forces acting on one side of the track; for instance, when a tree stump engages one side of the track only at an off-center location relative to the wheels.

The track assembly in accordance with the invention is characterized by the fact that metal chains are disposed along the rubber bands and have certain ones of their links secured to the rubber bands and the remaining links free of said rubber bands and have a limited longitudinal play with respect to the band-secured links, so that the chains allow a certain limited elongation and contraction of said rubber bands.

Figure 1:
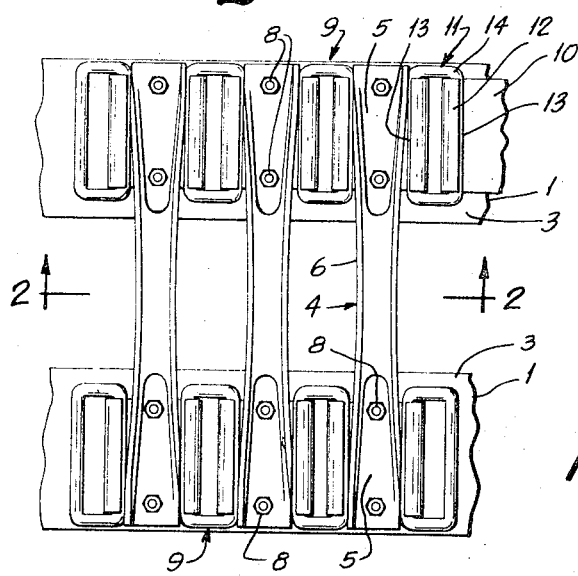
Figure 2:
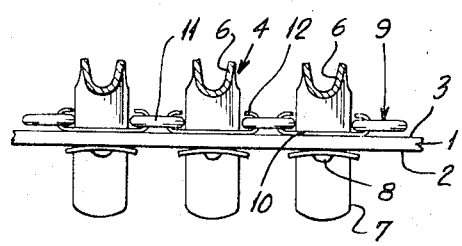
Figure 3:
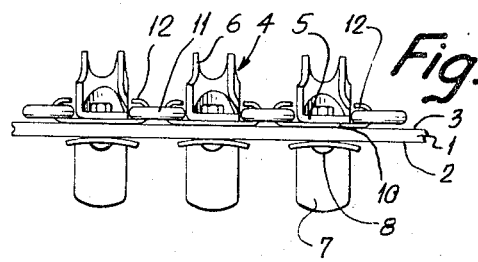

The foregoing and other important objects of the present invention will become more apparent during the following disclosure and by referring to the drawings, in which:

FIGURE 1 is a partial plan view of a track assembly in accordance with the invention;
FIGURE 2 is a cross-section of the same, taken along line 2—2 of FIGURE 1;
FIGURE 3 is a side elevation of the same; and
FIGURE 4 is a cross-section, on an enlarged scale, of the two different types of links of the chain.

Referring now more particularly to the drawings in which like reference characters indicate like elements throughout, the track assembly in accordance with the invention comprises a pair of spaced parallel bands 1 forming a complete loop and made of natural or synthetic rubber, and are preferably reinforced with a web of cotton or other synthetic resin or metal fibres.

The inner faces 2 of the bands 1 are adapted to face towards the wheels (not shown) supporting the endless track, while the outer faces 3 of the bands 1 are adapted to face towards ground. The two bands 1 are rigidly connected along longitudinally spaced zones by means of cross bars 4, of standard shape; said cross bars have a U-shape when seen in cross-section, with the U opening outwardly of the endless track. They have flattened outer zones 5 overlying the outer faces 3 of bands 1 and a longitudinally outwardly curved cenral zone 6 extending between the two bands 1 and adapted to at least partially conform to the rounder cross section of the tire of a supporting wheel.

The driving sprocket wheels (not shown) of the vehicle have their rubber teeth adapted to engage between the central zone 6 of the successive cross bars 4.

Track guards 7, independent of each other, are secured to the inner face 2 of the bands 1 opposite the outer zones 5 of the cross bars 4. Said track guards 7 are adapted to engage the sides of the wheel tires to prevent the track from jumping off said tires. The track guards 7 are of conventional construction and are rigidly secured to the bands 1 and across bars 4 by means of bolts and nuts 8, the bolts passing through the zones 5 of the cross bars 4, the bands 1 and the guards 7. The above construction is conventional.

In accordance with the present invention, a metal chain 9 is associated with each band 1. Chain 9 consists of plate links 10 alternating with rod links 11. Each plate link 10 consists of a generally rectangular shaped steel plate with its two longitudinal marginal portions bent back into a half-circle, as shown at 12. Each rod link 11 consists simply of a steel rod, of circular cross-section, forming a complete loop defined by straight longitudinal side portions 13 interconnected by substantially straight end portions 14.

The side portions 13 of the rod links 11 freely engage the bent marginal portions 12 of plate links 10. The chain 9 is disposed immediately over the outer face 3 of each band 1 with the longitudinal axis of the plate links 10 and rod links 11 transverse to the longitudinal axis of the band 1.

Each plate link 10 is sandwiched between the outer zone 5 of cross bar 4 and band 1 and is rigidly secured to the assembly of the cross bar, the band and the track guards by means of bolts 8 passing through the plate links. The rod links 11 extend between two successive cross bars 4 and are free of direct connections with the band 1.

In the flat normally stressed condition of the bands 1, and consequently of the links of the chain 9, the chain is not under tension and there is actually a small space between the bottom of the marginal portion 12 and the sides 13 of rod links 11. Thus, the band 1 can be elongated to a certain but definite extent, the limit of the elongation of said bands 1 being defined when the rod links 11 fully engage and abut against the bottom of the bent marginal portions 12 of the plate links 10, as shown in FIGURE 4.

The plate links 10 are applied directly on the outer face 3 of band 1 with its bent marginal portions 12 extending outwardly from the band 1. Preferably, the degree of elongation of the rubber bands 1 permitted by the chains 9 is such as to just allow turning movement of the endless tracks around the end wheels of the track vehicle, and thus this longitudinal play in the chains 9 is calculated dependent on the diameter of the end-supporting wheels of the track. Chain 9 can be contracted to a degree limited by abutment of link sides 13 against the sides of cross bar zones 5.

When a motor vehicle equipped with the endless tracks in accordance with the invention moves over a tree stump, pointed rocks or other similar obstructions, the track naturally makes a re-entrant angle between the wheels, but the radius of curvature will be much larger than if there were no chains 9, because the latter, due to the fact that they are disposed on the outside of bands 1, tend to contract more than the latter, in which case the sides 13 of rod links 11 move longitudinally with respect to the plate 10 and finally abut against the sides of cross bars 4. On the other hand, in the outside curve of track, the sides 13 of rod links 11 abut against the bottom of the bent marginal portions 12 of plate links 10, thereby defining a maximum elongation. Thus, the track is allowed to bend, both inwardly and outwardly, to a limited extent and, more specifically, through a much larger radius of curvature than if there were no chains. This prevents the rubber bands from bending through a sharp angle with consequent tearing of the same.

In the same manner, if a lateral force is exerted on the track, that is a localized force exerted longitudinally of the cross bars 4, the track will be allowed to curve in the plane thereof, but only through a limited extent due to the restricted contraction of the chain and, consequently, of the band on the inside of the curve, and the limited elongation of the chain and, consequently, of the band on the outside of the curve. Thus, the tendency for the track of jumping off its supporting wheels is completely eliminated.

Moreover, the track is allowed to twist longitudinally thereof through a much more limited extent, because the chains allow only a limited elongation of the bands.

However, when the vehicle is moving along relatively flat terrain with the tracks in their normal flattened condition, the chains 9 are not under any stress and there is practically no wear between the plate links 10 and rod links 7, as the latter are free of movement with respect to the plate links 10. Thus, the vehicle normally behaves as an endless track vehicle in which the tracks are made only of rubber bands with cross bars.

While a preferred embodiment in accordance with the invention has been illustrated and described, it is understood that various modifications may be resorted to without departing from the scope of the appended claim.

What I claim is:

In a track assembly for track-laying vehicles, a pair of spaced substantially parallel flexible endless bands, made of rubber or similar rubber-like material, and disposed longitudinally of the track assembly, transversely extending ground- and sprocket-engaging cross bars secured to said rubber bands at their ends and disposed at the outer face of said rubber bands and a metal chain disposed along the outer face of each rubber band and composed of plate links alternating with rod links, each plate link secured to said rubber band and sandwiched between said cross bar and said rubber band, each plate link associated with only one cross bar and only one rod link disposed between two adjacent cross bars, each plate link consisting of a plate with inturned opposed marginal portions extending on both sides of an associated cross bar, each rod link consisting of a loop made of a rod of circular cross-section defining substantially straight parallel side portions freely engaging the inturned marginal portions of said plate links, said side portions and inturned portions arranged transversely of said rubber band, said transverse side portions of said rod links being capable of movement within said inturned portions of said plate links between a limit position in which said rod links abut against the bottom of said inturned portions, and another limit position in which said rod links abut against the adjacent sides of the associated cross bar, the zones of said band in flattened condition causing said rod links to take an intermediate position relative to said plate links, in which said rod links are spaced both from the bottom of said inturned marginal portions and from the adjacent sides of the associated cross bar, so that said chains are free of external force in the flattened zones of said band.

References Cited

UNITED STATES PATENTS

| | | | |
|---|---|---|---|
| 2,893,787 | 7/1959 | Nodwell | 305—57 |
| 2,925,873 | 2/1960 | Laporte | 180—5 |
| 3,164,417 | 1/1965 | Howes | 305—35 X |
| 3,165,364 | 1/1965 | Hardman | 305—35 X |

FOREIGN PATENTS

| | | |
|---|---|---|
| 653,019 | 11/1962 | Canada. |
| 474,700 | 11/1937 | Great Britain. |
| 161,113 | 10/1957 | Sweden. |
| 362,936 | 8/1962 | Switzerland. |

BENJAMIN HERSH, *Primary Examiner.*

RICHARD J. JOHNSON, *Examiner.*